(12) United States Patent
Fujii (10) Patent No.: US 8,084,893 B2
(45) Date of Patent: Dec. 27, 2011

(54) SEMICONDUCTOR DEVICE FOR CONTROLLING SWITCHING POWER SUPPLY

(75) Inventor: Masanari Fujii, Matsumoto (JP)

(73) Assignee: Fuji Electric Systems Co., Ltd., Tokyo (JP)

(*) Notice: Subject to any disclaimer, the term of this patent is extended or adjusted under 35 U.S.C. 154(b) by 441 days.

(21) Appl. No.: 12/385,527

(22) Filed: Apr. 10, 2009

(65) Prior Publication Data
US 2009/0268488 A1 Oct. 29, 2009

(30) Foreign Application Priority Data
Apr. 28, 2008 (JP) ................. 2008-117691

(51) Int. Cl.
*H01H 35/00* (2006.01)
(52) U.S. Cl. .......................... 307/130; 363/49
(58) Field of Classification Search ............ 363/49, 363/86, 92; 307/130
See application file for complete search history.

(56) References Cited

U.S. PATENT DOCUMENTS
7,495,875 B2 * 2/2009 Lin .................. 361/89
7,723,972 B1 * 5/2010 Balogh ............. 323/282

FOREIGN PATENT DOCUMENTS
| JP | 2001-258249 A | 9/2001 |
| JP | 2006-014465 A | 1/2006 |
| JP | 2006-204082 A | 8/2006 |
| JP | 2006-304485 A | 11/2006 |

* cited by examiner

Primary Examiner — Shawn Riley
(74) Attorney, Agent, or Firm — Manabu Kanesaka (57) ABSTRACT

A semiconductor device controls a switching power supply. The semiconductor device includes a current inflow terminal; a starter circuit to cause a starting current to flow from the current inflow terminal to a power supply terminal to charge a capacitor externally connected to the power supply terminal; a control unit which controls the starter circuit to turn on to charge the capacitor with the starting current and controls the starter circuit to turn off to perform brown-out detection; a comparator which detects a brown-out state while the starter circuit is turned off; and a brown-out detection unit which receives output signals from the comparator and the control unit as inputs. The brown-out detection is performed while the starter circuit is off, so that the current inflow terminal for the starter circuit is used in common as a voltage detection terminal for detection of the brown-out state.

12 Claims, 3 Drawing Sheets

SEMICONDUCTOR DEVICE FOR CONTROLLING SWITCHING POWER SUPPLY

BACKGROUND OF THE INVENTION AND RELATED ART STATEMENT

The present invention relates to a semiconductor device for controlling a switching power supply. Particularly it relates to a semiconductor device for controlling a switching power supply, in which brown-out detection can be made without provision of any special input terminal for detecting brown-out (i.e., a voltage drop in an electrical power supply that may cause malfunction of a circuit).

There has been heretofore known a switching power supply control semiconductor device such as a switching power supply control IC having a power supply terminal Vcc, a mute terminal M for suspending a switching operation, an output terminal OUT and a feedback terminal FB, in which a switching element is operated by an output of a voltage detection circuit for detecting an input voltage input to a primary coil of a transformer so that the mute terminal M connected to the switching element is short-circuited to the ground through a resistor to suspend the operation of the main switching element (see JP-A-2006-14465).

There has been also heretofore known, for example, a switching power supply control semiconductor device having an input voltage detection unit for detecting an input voltage, a timer for obtaining an operating time longer than a cycle of an AC voltage by a time constant defined by a capacitor, a charging/discharging unit for charging/discharging the capacitor, and a timer control unit for controlling the charging/discharging unit based on the input voltage detected by the input voltage detection unit, wherein a brown-out detection function is provided so that the value of the input voltage input to a primary coil of a transformer can be detected surely during the operation of the timer while charging/discharging of the capacitor of the timer can be controlled by the timer control unit based on the voltage value detected by the input voltage detection unit (see JP-A-2006-304485).

There has been further heretofore known a DC-DC converter having a brown-out detection function in which abnormal reduction in an input voltage input to a primary coil of a transformer and an output voltage obtained from a secondary coil of the transformer is detected quickly to halt the switching operation and keep the halt state stably even when the input voltage increases temporarily after the switching operation is halted by reduction in the input voltage (see JP-A-2001-258249).

There has been further heretofore known a switching power supply control semiconductor device for turning on/off a switching element connected between a primary-side main winding wire of a transformer and the ground to supply electric power to a load connected to a secondary side of the transformer, including a power supply terminal which is externally connected with a capacitor and to which a power supply voltage is input from a primary-side auxiliary winding wire of the transformer, a starting terminal to which a voltage supplied to the primary side of the transformer is input, a charging starter element which allows a starting current to flow from the starting terminal to the power supply terminal to charge the capacitor, a control circuit which controls so that the starting current flows at startup, and a starter circuit provided with a starting current regulating circuit which keeps the starting current constant (see JP-A-2006-204082).

Although each of the switching power supply control semiconductor devices disclosed in JP-A-2006-14465, JP-A-2006-304485, and JP-A-2001-258249 was designed to detect the input voltage input to the primary coil of the transformer, it was necessary to provide a pin dedicated for brown-out detection and a pin dedicated for starting current inflow and charging, respectively and individually. For this reason, there was a problem that the number of pins in the switching power supply control semiconductor device increased. Because the number of pins in a semiconductor device always needs to be reduced, the increase in the number of pins is not desirable in view of the needs.

In the switching power supply control semiconductor device disclosed in JP-A-2006-204082, a starter circuit is provided but there is no technique concerning reduction in the number of pins in the switching power supply control semiconductor device.

In the switching power supply control semiconductor device disclosed in JP-A-2006-204082, the number of pins can be reduced if brown-out can be detected by a current inflow and charging at terminal VH, but there is a problem as the following. That is, when an AC (alternating current) power source for supplying an input voltage to a primary-side coil of a transformer is used to allow a starting current to flow into the starter circuit at startup, the input voltage from the AC (alternating current) power source is applied directly to the high voltage input terminal VH. It is therefore necessary to provide a current limiting resistor RVH having a high resistance of several KΩ in order to prevent abnormality such as short-circuiting between the high voltage input terminal VH and the ground GND. When the starter circuit is on, the starting current flows into the starter circuit via the current limiting resistor RVH so that a voltage drop occurs in the current limiting resistor RVH. For this reason, the voltage on the high potential side of the current limiting resistor RVH can be hardly detected by the brown-out detection comparator. Accordingly, to avoid this trouble, a pin dedicated for brown-out detection and a pin dedicated for starting current inflow and charging need be provided as an integrated circuit in the same manner as in the switching power supply control semiconductor device disclosed in each of JP-A-2006-14465, JP-A-2006-304485, and JP-A-2001-258249. Consequently, there was a problem that the number of pins increased because such a pin dedicated for brown-out detection and a pin dedicated for starting current inflow and charging were required.

Therefore, in order to solve the aforementioned problems, one of the objectives of the present invention is to provide a semiconductor device for controlling a switching power supply, in which a voltage detection terminal for brown-out detection is used in common as a current inflow terminal for a starter circuit so that brown-out detection is enabled without provision of any special input terminal for brown-out detection.

Further objects and advantages of the invention will be apparent from the following description of the invention.

SUMMARY OF THE INVENTION

To achieve the foregoing objectives, the invention provides a semiconductor device for controlling a switching power supply, including a power supply terminal which is externally connected with a capacitor and to which a power supply voltage is input from an auxiliary winding wire of a transformer having a primary winding wire supplied with a voltage obtained by full-wave rectification of an AC voltage of a commercial power source; a current inflow terminal to which a voltage obtained by half-wave rectification or full-wave rectification of the AC voltage of the commercial power source is input through a limiting resistor; a starter circuit which allows a starting current from the current inflow terminal to the power supply terminal to charge the capacitor; a control unit which controls the starter circuit to turn on to charge the capacitor with the starting current and controls the starter circuit to turn off to perform brown-out detection; a comparator which detects occurrence of a brown-out state when the control unit controls the starter circuit to turn off; and a brown-out detection unit which has an output of the comparator and an output of the control unit as inputs and which detects brown-out by sensing continuation of the occurrence of the brown-out state for a predetermined time, wherein the brown-out detection is performed only when the starter circuit is off, so that the current inflow terminal for the starter circuit is used in common with a voltage detection terminal for detection of the brown-out.

According to the invention, the starter circuit is turned on/off so that the voltage at the current inflow terminal is detected only in a period in which there is no current flowing into the starter circuit. Accordingly, variation in the AC input voltage can be monitored accurately without influence of impedance from the input AC power source line to the current inflow terminal. Consequently, it is possible to provide a semiconductor device for controlling a switching power supply, in which a voltage detection terminal is used in common as a current inflow terminal so that brown-out detection is enabled without provision of any special input terminal for brown-out detection.

DETAILED DESCRIPTION OF PREFERRED EMBODIMENTS

One or more embodiments of the invention will be described below with reference to the accompanying drawings.

Figure 1:
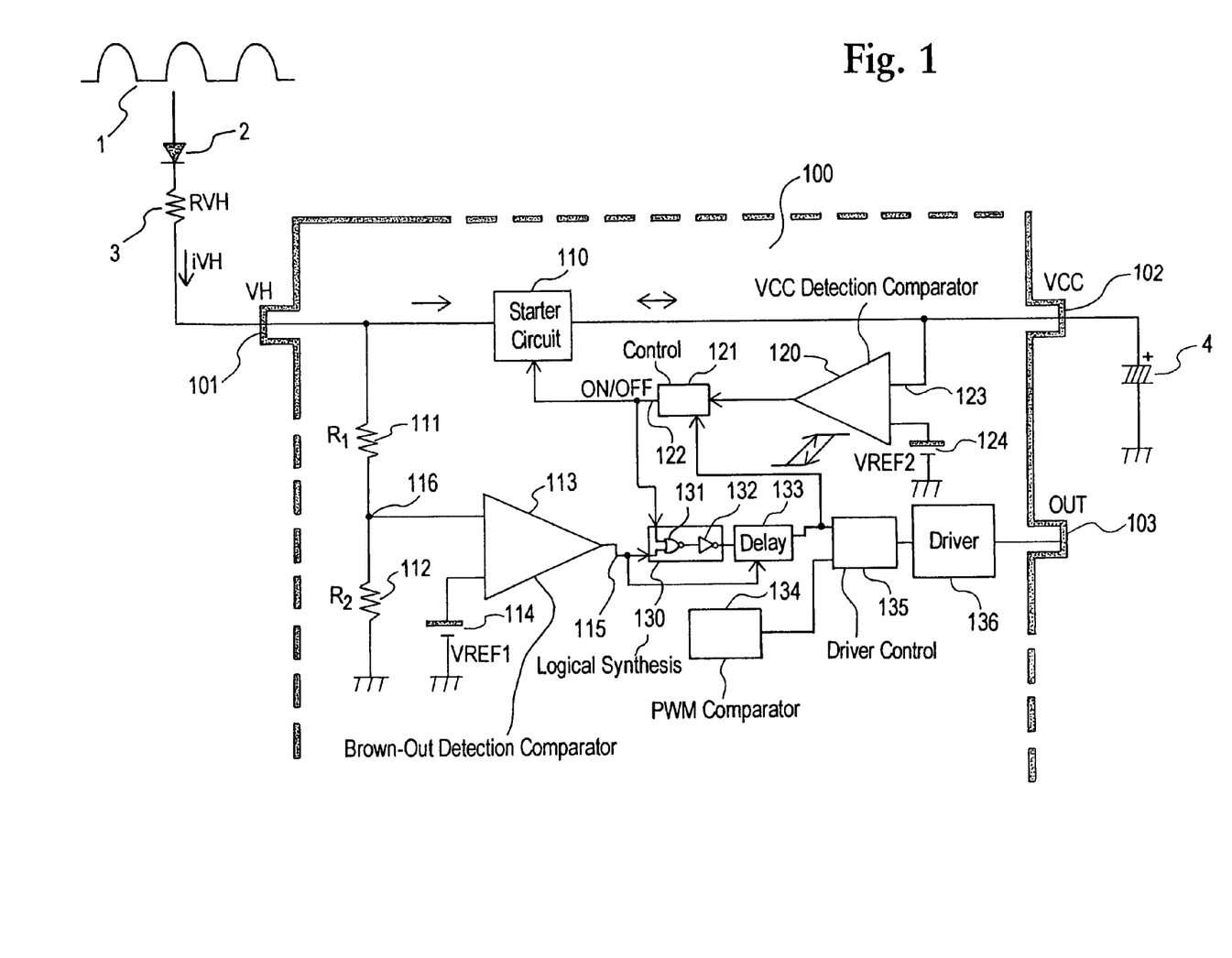
FIG. 1 is a diagram showing a configuration of a switching power supply control semiconductor device according to an embodiment of the invention.

FIG. 1 is a block diagram showing a configuration of a switching power supply control semiconductor device according to an embodiment of the invention. In FIG. 1, the configuration of the switching power supply control semiconductor device (hereinafter abbreviated to "power supply control IC") 100 is shown in a dotted line frame provided with protrusions which represent terminals of the power supply control IC 100.

That is, a terminal VH (101) is a high voltage input terminal to which an AC input voltage 1 obtained by half-wave rectification of a voltage from a commercial power source (not shown) is input. The high voltage input terminal VH (101) serves as a current inflow terminal for allowing a current to flow into a starter circuit (110) and allowing a charging current to flow into a capacitor externally connected to a power supply terminal VCC (which will be described later). The high voltage input terminal VH (101) serves also as a voltage detection terminal which is connected to a series circuit of voltage-dividing resistors $R_1$ (111) and $R_2$ (112) in the power supply control IC (100) so that a tap voltage extracted from a junction (116) of the voltage-dividing resistors $R_1$ (111) and $R_2$ (112) is applied to a plus terminal of a brown-out detection comparator (113). In addition, the voltage-dividing resistors $R_1$ (111) and $R_2$ (112) are set to have high resistance values so that a current flowing from the terminal VH (101) to the ground via the voltage-dividing resistors $R_1$ (111) and $R_2$ (112) can be ignored.

A terminal VCC (102) is provided so that a starting current iVH flowing into the starter circuit (110) via the current inflow terminal (101) at startup flows into the capacitor 4 externally connected to the terminal VCC to thereby charge the capacitor 4. Accordingly, the voltage at the high voltage input terminal VH (101) is higher than the voltage at the terminal VCC (102) while the capacitor 4 is charged with the starting current iVH. A transformer (not shown) is provided so that an AC input voltage obtained by full-wave rectification of a commercial power source (not shown) is applied to a primary winding wire of the transformer. While an AC voltage induced in an auxiliary winding wire (not shown) of the transformer in the aforementioned condition is connected to a plus terminal of the capacitor 4 via a rectifying diode (not shown), the plus terminal of the capacitor 4 is connected to the terminal VCC. Accordingly, the voltage at the terminal VCC increases as the capacitor 4 is charged. When the voltage at the terminal VCC exceeds a predetermined level, the terminal VCC supplies electric power to respective constituent members of the power supply control IC 100. Accordingly, the terminal VCC (102) is called a "power supply terminal".

A terminal OUT (103) is a terminal for supplying an output signal of the power supply control IC (100) to a gate terminal (not shown) of a main switching element (not shown but generally provided as a power transistor made of a MOSFET or the like) connected to the primary-side main winding wire (not shown) of the transformer (not shown) to which the AC input voltage obtained by full-wave rectification of the commercial power source (not shown) is input. The on/off operation of the main switching element (not shown) is controlled based on the output signal of the power supply control IC 100 given to the gate terminal (not shown) of the main switching element (not shown) from the terminal OUT, so that the AC voltage induced in the secondary side of the transformer (not shown) is rectified to obtain a desired DC output voltage. The configuration of this portion with respect to the terminal OUT (103) may be the same as in FIG. 2 in JP-A-2006-204082 in accordance with one embodiment.

Although the power supply control IC (100) has an IS (current detection) terminal for detecting a current flowing in the main switching element (not shown) as a voltage via a resistor (not shown), an FB (feedback) terminal for feedback controlling the DC output voltage obtained in the aforementioned manner, etc. in addition to the terminal VH (101), the terminal VCC (102) and the terminal OUT (103), the illustration and description of the IS terminal, the FB terminal, etc. will be omitted for simplicity.

As described above, the terminal VH (101) serves as a current inflow terminal for allowing a current to flow into the starter circuit (110) and serves also as a voltage detection terminal for extracting a tap voltage from the junction (116) of the voltage-dividing resistors $R_1$ (111) and $R_2$ (112) and applying the tap voltage to the plus terminal of the brown-out detection comparator (113). On the other hand, the AC input voltage 1 obtained by half-wave rectification of the commercial power source (not shown) is applied to the terminal VH (101) via a reverse current prevention diode 2 and a current limiting resistor RVH 3 (generally 3kΩ or larger). Although the operation in the invention has been described assuming that the voltage applied to the terminal VH (101) is obtained by half-wave rectification, the invention is not limited thereto and it is a matter of course that the voltage can be achieved by full-wave rectification. The reason that half-wave rectification is shown as an example is that the use of half-wave rectification can reduce a current flowing into the starter circuit (110) in an off period, when compared to the use of full-wave rectification, because a slight current flows into the starter circuit (110) even when the starter circuit (110) is turned off.

At startup, the starter circuit (110) is controlled to be turned on, so that the starting current iVH from the half-wave rectified AC input voltage 1 flows into the starter circuit (110) via the current limiting resistor RVH 3. The starting current iVH flowing into the starter circuit (110) further flows into the capacitor 4 externally connected to the power supply terminal VCC (102) to thereby charge the capacitor 4 and increase the voltage at the terminal VCC (102). Further, a control signal ON/OFF for controlling the on/off operation of the starter circuit (110) is output from a control circuit (121) for monitoring an output of a VCC detection comparator (120). At startup, the control circuit (121) outputs a control signal ON as an output control signal (122). The control signal will be described later.

As described above, the terminal VH (101) serves also as a voltage detection terminal for extracting a tap voltage from the junction (116) of the voltage-dividing resistors $R_1$ (111) and $R_2$ (112) and applying the tap voltage to the plus terminal of the brown-out detection comparator (113). On the other hand, the reference voltage VREF1 (114) is applied to a minus terminal of the brown-out detection comparator (113). The brown-out detection comparator (113) compares the tap voltage applied to the plus terminal with the reference voltage VREF1. When the reference voltage VREF1 (114) is lower than the tap voltage at the junction 116, an output (115) of the brown-out detection comparator (113) has a logic H (high). On the other hand, when the reference voltage VREF1 (114) is higher than the tap voltage at the junction 116, the output (115) of the brown-out detection comparator (113) has a logic L (low). Accordingly, in a state where brown-out is detected (the AC input voltage 1 is reduced to be lower than a brown-out detection threshold voltage VthBO (see FIG. 3)), the output (115) of the brown-out detection comparator (113) has a logic L so that the logic L output is input to a logical synthesis circuit (130) at the next step. In addition, the brown-out detection comparator (113) is formed of a hysteresis comparator which can detect also brown-in (which will be described later). Two reference voltages in the brown-out detection comparator (113) (although only a single voltage source (reference voltage VREF1 (114)) is shown in FIG. 1) are set as voltages obtained by dividing a brown-in detection threshold voltage VthBI and a brown-out detection threshold voltage VthBO (which will be described with reference to time charts of FIGS. 2 and 3) by the voltage-dividing resistors $R_1$ (111) and $R_2$ (112). For reference, specific values of the brown-out detection threshold voltage VthBO and the brown-in detection threshold voltage VthBI are exemplified as follows. When the commercial AC power source (not shown) is 100Vac, the brown-out detection threshold voltage is set at VthBO=70Vac=70*($\sqrt{2}$)Vdc and the brown-in detection threshold voltage is set at VthBI=80Vac=80*($\sqrt{2}$)Vdc.

In the example shown in FIG. 1, the logical synthesis circuit (130) includes a NOR circuit (131) and an inverter circuit 132. As input signals to the logical synthesis circuit 130, the output (115) of the brown-out detection comparator (113) and the output (122) of the control circuit (121) are input to the NOR circuit (131). Brown-out detection is performed when the output (122) of the control circuit (121) is an OFF signal. The OFF signal is represented as L (low) in logical level. Accordingly, when brown-out is detected (specifically, see FIG. 3), the logic L of the output (115) of the brown-out detection comparator (113) and the logic L of the output (122) of the control circuit (121) are input to the NOR circuit (131) so that the output of the NOR circuit (131) has a logic H. The logic H of the output of the NOR circuit (131) is input to the inverter circuit 132, so that the output of the inverter circuit (132) has a logic L. The logic L of the output of the inverter circuit (132) is input to a delay circuit 133. On the other hand, when the output (115) of the brown-out detection comparator (113) is input as a reset signal for resetting the delay circuit (133) to the delay circuit (133) but the signal (logic H) resetting the delay circuit (133) is not input until a predetermined delay time (for example, greater than a cycle of the commercial power source) is measured by the delay circuit (133), a logic L is input as the output of the delay circuit (133) to a driver control circuit (135). (This operation is performed also in the case where a reset signal is input. Otherwise, a logic H is input as the output of the delay circuit (133) to the driver control circuit 135.) Consequently, the driver control circuit 135 prevents a PWM comparator (134) from outputting a pulse-width modulated high-speed pulse signal to a driver 136. For this reason, the output signal of the power supply control IC (100) output at the terminal OUT (103) via the driver (136) is stopped from being input to a gate of the main switching element (not shown), so that the on/off operation of the main switching element (not shown) is halted (in an OFF state). It should be noted that the aforementioned configuration of the logical synthesis circuit (130) is not limited to the logical synthesis including the NOR circuit (131) and the inverter circuit (132) shown in FIG. 1 and may be modified variously without departing from the gist of the invention.

According to the aforementioned configuration, brown-out detection is performed only in an OFF period of the starter circuit (110) but brown-in detection may always be performed regardless of whether the starter circuit (110) is on or off. In this instance, when the starter circuit (110) is on, brown-in is not detected because of a voltage drop in the current limiting resistor RVH 3 unless the AC input voltage 1 is higher than the brown-in detection threshold voltage VthBI. However, the fact that the AC input voltage 1 is sufficiently high is detected, so that there is no problem when this is judged as brown-in. This is referred to as the first brown-in detection method. Alternatively, brown-in detection may be restricted to an OFF period of the starter circuit (110) in the same manner as brown-out detection. This is referred to as the second brown-in detection method. The second brown-in detection method can be achieved as follows. For example, an OR signal obtained by ORing an inverted signal of the output (122) of the control circuit (121) and the output (115) of the brown-out detection comparator (113) is generated so that the delay circuit (133) can be reset when the logic level of the OR signal turns to H.

The VCC detection comparator (120) will be described below. A power supply voltage (123) at the power supply terminal VCC (102) is input to a minus terminal of the VCC detection comparator (120) while a reference voltage VREF2 (124) is input to a plus terminal of the VCC detection comparator 120. In this condition, the VCC detection comparator (120) compares the power supply voltage (123) at the power supply terminal VCC (102) with the reference voltage VREF2 (124). When the reference voltage VREF2 (124) is higher than the power supply voltage (123) at VCC, the output of the VCC detection comparator (120) has a logic H (high). The logic H signal is input to the control circuit 121, so that the output (122) of the control circuit has a logic H. The logic H signal (122) serves as a control signal ON. At startup, the control signal is placed in the ON state.

On the other hand, when the reference voltage VREF2 (124) is lower than the power supply voltage (123) at VCC, the output of the VCC detection comparator (120) has a logic L (low). The logic L signal is input to the control circuit (121), so that the output (122) of the control circuit has a logic L. The logic L signal (122) serves as a control signal OFF. At brown-out detection, the control signal is placed in the OFF state. This embodiment will be described later. Further, the VCC detection comparator (120) may be formed of a hysteresis comparator. Two reference voltages in the VCC detection comparator (120) (although only a single voltage source (reference voltage VREF2 (124)) is shown in FIG. 1) are set as VccBOH (first threshold voltage) and VccBOL (second threshold voltage) which will be described with reference to time charts of FIGS. 2 and 3.

Figure 2:
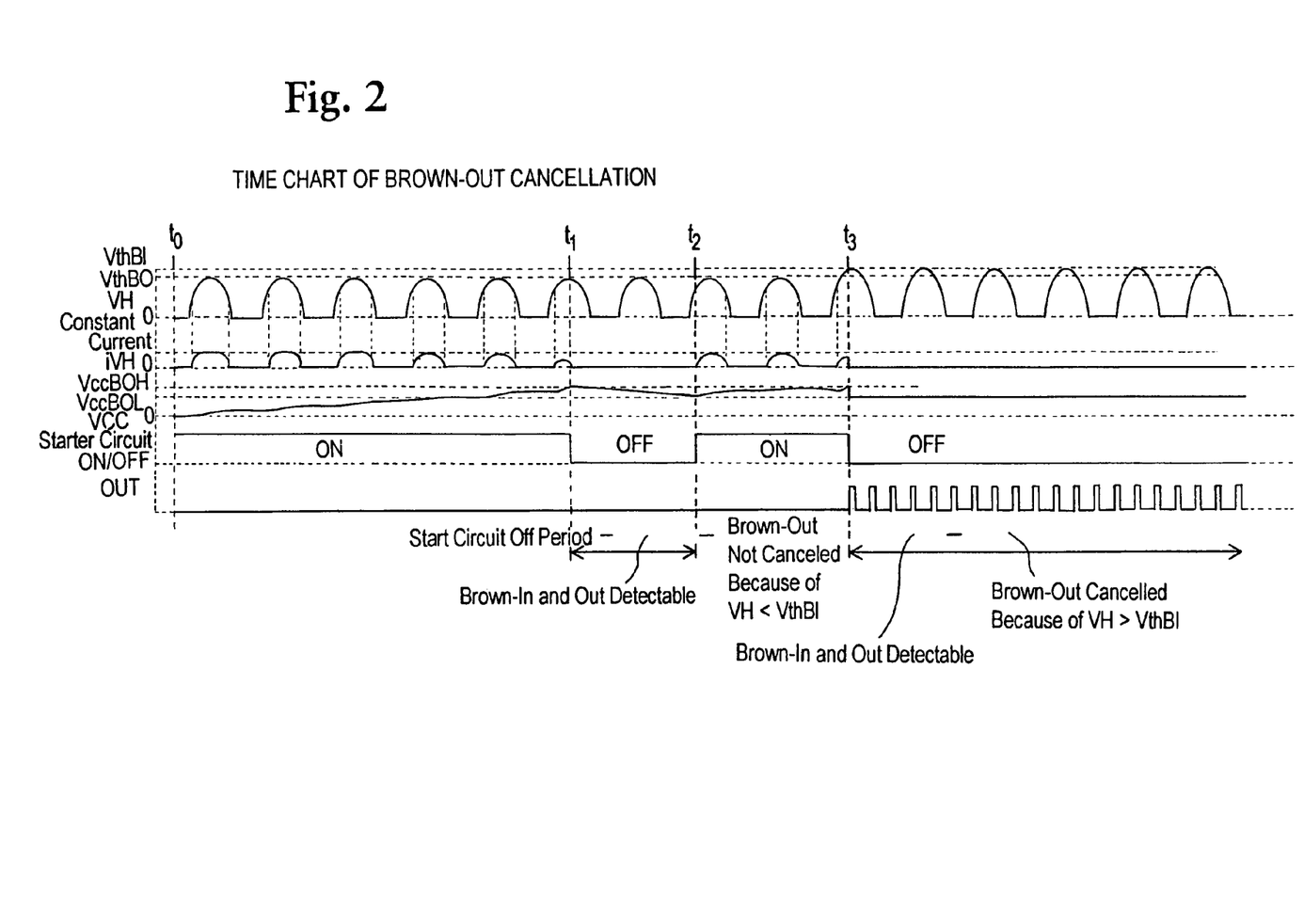
FIG. 2 is a time chart for explaining a brown-out canceling operation at startup according to an embodiment of the invention.

FIG. 2 is a time chart for explaining a brown-out canceling operation at startup according to the embodiment of the invention. In the time chart of FIG. 2, the starter circuit (110) is in an ON state at startup time to as described above. When the half-wave rectified AC input voltage 1 is input to the high voltage input terminal VH (101), a starting current iVH flows into the starter circuit (110). On the other hand, the power supply voltage (123) at the power supply terminal VCC (102) is about 0V at startup. The power supply voltage (123) at the power supply terminal VCC (102) increases slowly with passage of time.

As shown in FIG. 1 in JP-A-2006-204082 and the description regarding FIG. 1, the starter circuit (110) is provided with a starting current regulating circuit (not shown) which keeps the starting current iVH constant. When the voltage at the high voltage input terminal VH (101) is higher by a certain amount than the voltage at the power supply terminal VCC (102), the starting current iVH can be kept constant. As shown in FIG. 2, the waveform of the starting current iVH at a leading edge of the high voltage input terminal VH (101) is substantially proportional to the waveform of the voltage input to the high voltage input terminal VH (101), so that the starting current iVH shows a constant current characteristic when the voltage input to the high voltage input terminal VH (101) becomes high to a certain amount. As the voltage at the power supply terminal VCC (102) increases in accordance with the starting current iVH, the leading edge of the starting current iVH gradually lags behind the leading edge of the voltage input to the high voltage input terminal VH (101).

At time $t_1$, the VCC detection comparator (120) outputs a logic L by detecting that the voltage (123) of the power supply terminal VCC (102) input to the minus terminal of the VCC detection comparator (120) exceeds the first threshold voltage VccBOH of the reference voltage VREF2 (124). The logic L is input to the control circuit 121. As a result, the control circuit (121) outputs an OFF signal at the output 122. Accordingly, the starter circuit (110) is turned off to obtain a period in which both brown-in and brown-out can be detected. However, brown-out cancellation is not performed in a period between time $t_1$, and time $t_2$ because the voltage at the high voltage input terminal VH (101) does not exceed the brown-in detection threshold voltage VthBI applied to the minus terminal of the brown-out detection comparator (113) for brown-in detection. Moreover, because the starter circuit (110) is in an OFF state, there is no starting current iVH flowing into the starter circuit (110), and accordingly, there is no charging current flowing into the capacitor 4 connected to the power supply terminal VCC (102). Accordingly, the electric potential of the power supply terminal VCC (102) is reduced. When the reduced electric potential of the power supply terminal VCC (102) becomes lower than the second threshold voltage VccBOL of the reference voltage VREF2 (124) applied to the plus terminal of the VCC detection comparator (120), the VCC detection comparator (120) detects this fact and outputs a logic H. The logic H is input to the control circuit (121). As a result, the control circuit (121) outputs an ON signal as the output (122). Accordingly, the starter circuit (110) is turned on at time $t_2$, so that the charging current iVH is allowed to flow into the capacitor 4 again. Then, when the VCC detection comparator (120) detects that the voltage (123) of the power supply terminal VCC (102) input to the minus terminal of the VCC detection comparator (120) exceeds the first threshold voltage VccBOH of the reference voltage VREF2 (124) at time $t_3$, the control circuit (121) outputs an OFF signal as the output (122) to obtain a period in which both brown-in and brown-out can be detected. When the brown-out detection comparator (113) detects that the voltage input to the high voltage input terminal VH (101) exceeds the brown-in detection threshold voltage VthBI applied to the minus terminal of the brown-out detection comparator (113) for brown-in detection in the brown-in detectable period (full time in the case of the first brown-in detection method or in the OFF state of the starter circuit (110) in the case of the second brown-in detection method), the brown-out detection comparator (113) outputs a logic H as the output (115) to obtain brown-out cancellation, that is, brown-in. In FIG. 2, the power supply control IC (100) can get into a normal operation at time $t_3$ when brown-in can be performed because the brown-out detection comparator (113) detects that the voltage input to the high voltage input terminal VH (101) exceeds the brown-in detection threshold voltage VthBI.

Figure 3:
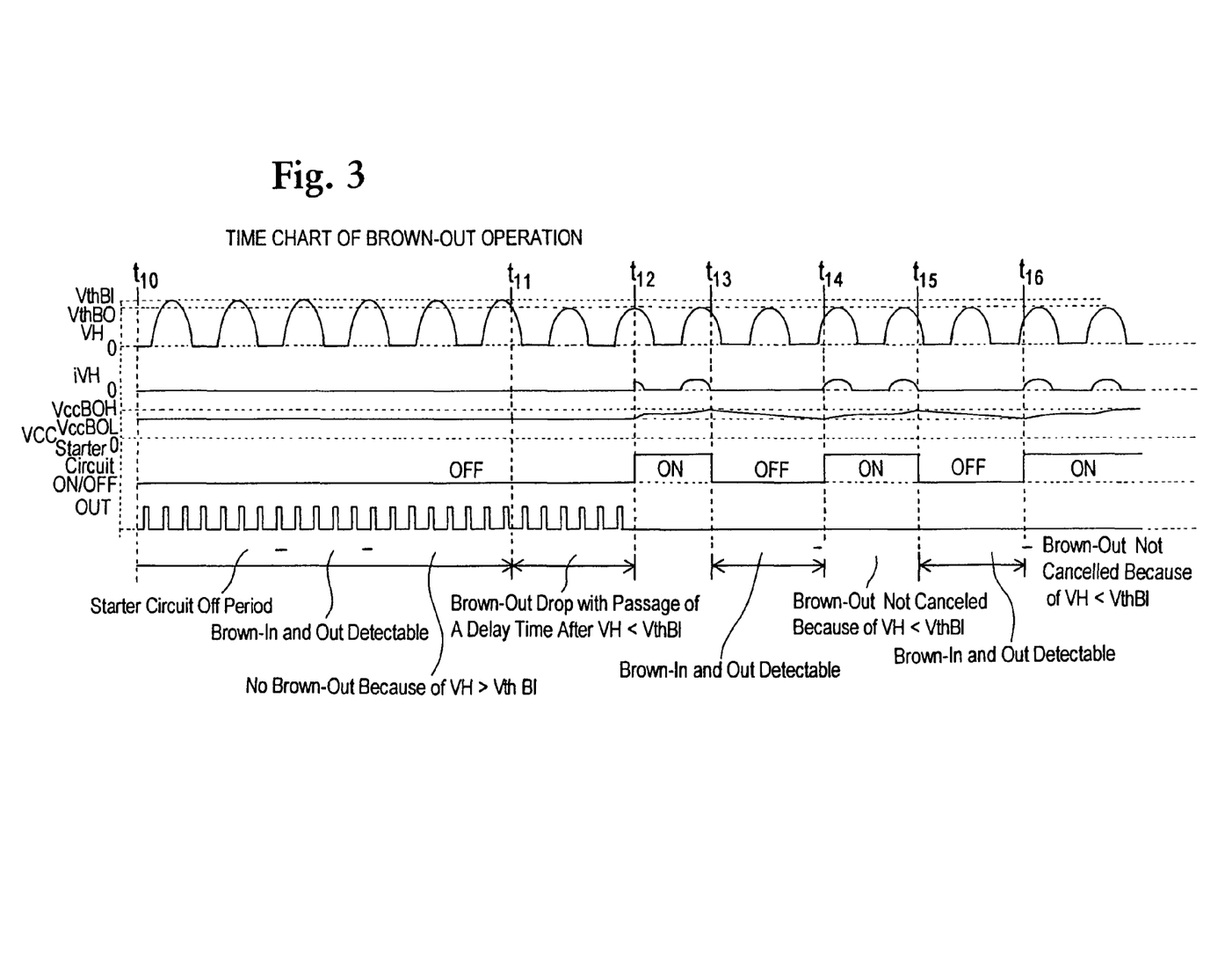
FIG. 3 is a time chart for explaining a brown-out detecting operation according to an embodiment of the invention.

FIG. 3 is a time chart for explaining a brown-out operation (an operation for judging whether it is really a brown-out state or not) according to the embodiment of the invention. The time chart of FIG. 3 shows a state where the power supply control IC (100) is operating normally at time $t_{10}$. That is, the starter circuit (110) is turned off by a normal operation after brown-in shown in FIG. 2 (the starter circuit (110) is turned off in accordance with the output signal of the delay circuit (133) regardless of the output of the VCC detection comparator (120) in a brown-in state). On this occasion, the half-wave rectified AC input voltage 1 higher than the brown-in detection threshold voltage VthBI is input to the high voltage input terminal VH (101). On this occasion, the delay circuit (133) is in an OFF state because of a brown-in state as described above, so that a normal switching operation is performed. Accordingly, the power supply voltage (123) at the power supply terminal VCC (123) is kept at a steady-state value (set voltage) given from the auxiliary winding wire.

In a period between time $t_{10}$ and time $t_{11}$, brown-out detection is enabled because the starter circuit (110) is in an OFF state. However, because the peak value of the half-wave rectified AC input voltage 1 input to the high voltage input terminal VH (101) is higher than the brown-in detection threshold voltage VthBI applied to the minus terminal of the brown-out detection comparator (113) for brown-in detection, the delay circuit (133) is reset by the peak value of the AC input voltage 1 whenever the AC input voltage 1 takes the peak value. Consequently, there is no halt state caused by brown-out.

At time $t_{11}$ when the value (momentary value) of the half-wave rectified AC input voltage 1 input to the high voltage input terminal VH (101) becomes lower than the brown-out detection threshold voltage VthBO applied to the minus terminal of the brown-out detection comparator (113) for brown-out detection, a brown-out operation is started. In this instance, the output (115) of the brown-out detection comparator (113) has a logic L as described above, so that the logic L output is input to the logical synthesis circuit (130) at the next step. On the other hand, at this timing, the output (122) of the control circuit (121) is provided as an OFF signal. The OFF signal is represented as L (low) in terms of logic level. Accordingly, in the timing of detection of brown-out, the logic L of the output (115) of the brown-out detection comparator (113) and the logic L of the output (122) of the control circuit (121) are input to the NOR circuit (131), so that the output of the NOR circuit (131) has a logic H. The logic H is input to the inverter circuit 132, so that the output of the inverter circuit (132) has a logic L. The logic L is input to the delay circuit (133).

At time $t_{12}$ when the delay circuit (133) can complete measurement of a predetermined delay time, the delay circuit (133) outputs a logic L to the driver control circuit (135) to prevent the PWM comparator (134) from outputting a pulse-width modulated high-speed pulse signal to the driver (136). As a result, the output signal of the power supply control IC (100) to be output at the terminal OUT (103) via the driver (136) is stopped from being input to the gate of the main switching element (not shown), so that the on/off operation of the main switching element (not shown) is halted (in an OFF state). When the power supply voltage (123) at the power supply terminal VCC (102) becomes lower than the second threshold voltage VccBOL of the reference voltage VREF2 (124) applied to the plus terminal of the VCC detection comparator (120) in accordance with the halt of the switching operation of the switching power supply based on detection of brown-out, the VCC detection comparator (120) detects the fact and outputs a logic H. The logic H is input to the control circuit (121). As a result, the control circuit (121) outputs an ON signal as the output (122). Accordingly, the starter circuit (110) is turned on at time $t_{12}$, so that the charging current iVH is supplied into the capacitor 4. Consequently, the brown-out operation shown in FIG. 3 is shifted to the brown-out canceling operation shown in FIG. 2.

In the period between time $t_{13}$ and time $t_{14}$, both brown-in and brown-out can be detected. However, brown-out cancellation is not performed because the voltage input to the high voltage input terminal VH (101) does not exceed the brown-in detection threshold voltage VthBI applied to the minus terminal of the brown-out detection comparator (113) for brown-in detection. After time $t_{14}$, brown-out cancellation is still not performed because the voltage input to the high voltage input terminal VH (101) does not exceed the brown-in detection threshold voltage VthBI applied to the minus terminal of the brown-out detection comparator (113) for brown-in detection.

As the voltage (123) at the power supply terminal VCC (102) changes between the second threshold voltage VccBOL and the first threshold voltage VccBOH of the reference voltage VREF2 (124) applied to the plus terminal of the VCC detection comparator (120), the starter circuit (110) switches between the ON state and the OFF state repeatedly. When the second brown-in detection method is used, a brown-out canceling operation is performed in the same manner as at time $t_3$ in FIG. 2 if the voltage (123) at the power supply terminal VCC (102) exceeds the brown-in detection threshold voltage VthBI in the OFF state of the starter circuit (110). When the first brown-in detection method is used, a brown-out canceling operation is performed simply if the voltage (123) at the power supply terminal VCC (102) exceeds the brown-in detection threshold voltage VthBI.

Although the above descriptions have been made assuming that the momentary value of the AC input voltage 1 obtained by half-wave rectification of the commercial power source (not shown) is used for detection of brown-in and brown-out, the output of a diode bridge for rectifying the commercial power source (not shown) may be smoothened by a capacitor provided next to the diode bridge so that the thus smoothened voltage value can be used for detection of brown-in and brown-out.

The half-wave rectified AC input voltage may be replaced by a full-wave rectified AC input voltage. Generally, two brown-out and brown-in detection methods are known when full-wave rectification is used. That is, when a brown-out and brown-in detection method in a power supply control IC to achieve PFC (power factor correction) is used as the first method, the capacitance of the capacitor Ci provided next to the diode bridge is reduced (in this case, the capacitor Ci has the function of removing ripples caused by switching by means of the main switching element). Accordingly, the waveform becomes an absolute-value waveform of sinusoidal wave, so that the same detection method as in the case where the half-wave rectified AC input voltage is used in the aforementioned embodiment can be obtained. When a brown-out and brown-in detection method in a power supply control IC without PFC is used as the second method, the capacitance of the capacitor Ci is increased to smoothen the output of the diode bridge. Accordingly, the average value of the AC input voltage, not the momentary value of the AC input voltage, is used for detection of brown-out and brown-in. When full-wave rectification is used as described above, either of the first and second methods as the brown-out and brown-in detection method first uses a hysteresis comparator for comparing the input voltage with the reference voltage. In the second method in which the average value of the input voltage is used, it is theoretically possible to dispense with a timer at the next step provided on the output side of the brown-in/brown-out detection comparator. However, a timer may be often used actually in connection with other functions.

The disclosure of Japanese Patent Application No. 2008-117691 filed on Apr. 28, 2008 is incorporated herein by reference in its entirety.

While the invention has been explained with reference to the specific embodiments of the invention, the explanation is illustrative and the invention is limited only by the appended claims.

What is claimed is:

1. A semiconductor device for controlling a switching power supply, comprising:

a power supply terminal to be externally connected to a capacitor;

a current inflow terminal to which a voltage obtained by half-wave rectification or full-wave rectification of an AC voltage of a power source is to be input;

a starter circuit configured to cause a starting current to flow from the current inflow terminal to the power supply terminal so as to charge the capacitor externally connected to the power supply terminal;

a control unit which controls the starter circuit to turn on so as to charge the capacitor with the starting current and controls the starter circuit to turn off to perform brown-out detection;

a comparator which detects a brown-out state while the starter circuit is turned off; and a brown-out detection unit configured to receive an output signal from the comparator and an output signal from the control unit as inputs and to detect the brown-out state based on the inputs, wherein the brown-out detection is performed while the starter circuit is turned off, so that the current inflow terminal for the starter circuit is used in common as a voltage detection terminal for detection of the brown-out state.

2. The semiconductor device according to claim 1, wherein:
the comparator includes a hysteresis comparator having two reference voltages; and
one of the two reference voltages is used as a second reference voltage that is different from a first reference voltage used for detection of the brown-out state, so that the brown-out detection unit is used for detection of brown-out cancellation.

3. The semiconductor device according to claim 1, wherein a power supply voltage is input to the power supply terminal.

4. The semiconductor device according to claim 3, wherein the power supply terminal is externally connected to a transformer including a primary winding wire and an auxiliary winding wire, the primary winding wire being supplied with a voltage obtained by full-wave rectification of the AC voltage of the power source, and the auxiliary winding wire supplying the power supply voltage to the power supply terminal.

5. The semiconductor device according to claim 3, further comprising a comparison unit which compares the power supply voltage at the power supply terminal with a third reference voltage, wherein an output of the comparison unit is supplied to the control unit.

6. The semiconductor device according to claim 5, wherein the comparison unit includes a hysteresis comparator having two reference voltages.

7. The semiconductor device of claim 1, wherein the voltage is input through a current-limiting resistor to the current inflow terminal.

8. The semiconductor device of claim 1, wherein brown out detection unit detects brown-out by sensing the brown-out state for a predetermined time.

9. The semiconductor device of claim 1, wherein the brown out detection unit comprises a NOR gate and an inverter connected in series to each other.

10. The semiconductor device of claim 1, further comprising a driver control circuit connected to the brown out detection unit and configured to control a driver according to a detection signal from the brown out detection unit.

11. The semiconductor device of claim 10, further comprising a driver connected to the driver control circuit and configured to control the switching element externally connected to the driver according to the detection signal from the brown out detection unit.

12. An AC-DC converter which controls a switching element by using the semiconductor device for controlling a switching power supply as defined in claim 1.

* * * * *

UNITED STATES PATENT AND TRADEMARK OFFICE
CERTIFICATE OF CORRECTION

PATENT NO. : 8,084,893 B2
APPLICATION NO. : 12/385527
DATED : December 27, 2011
INVENTOR(S) : Masanari Fujii It is certified that error appears in the above-identified patent and that said Letters Patent is hereby corrected as shown below:

Please change column 7, line 21, "to" to --$t_0$--.

Signed and Sealed this
Tenth Day of July, 2012

David J. Kappos
*Director of the United States Patent and Trademark Office*